Patented May 28, 1935

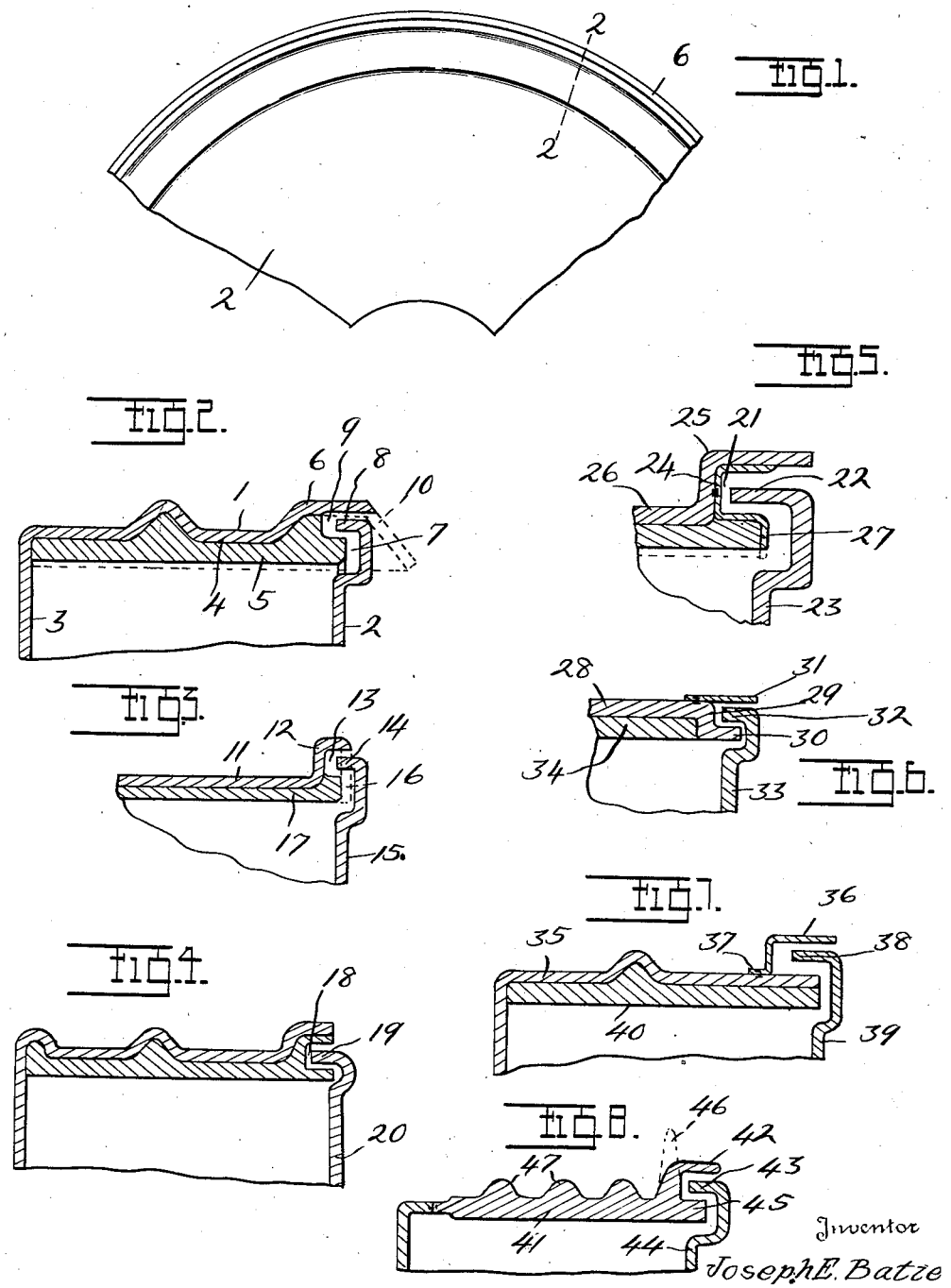

2,003,063

UNITED STATES PATENT OFFICE 2,003,063

BRAKE DRUM CONSTRUCTION

Joseph E. Batie, Detroit, Mich., assignor, by mesne assignments, to The Kelsey-Hayes Wheel Company, Detroit, Mich., a corporation of Delaware Application May 9, 1932, Serial No. 610,213

3 Claims. (Cl. 188—218)

The invention relates to brake drum constructions and has for one of its objects to provide an improved seal between the brake drum and the back plate. Another object is to secure this seal with a composite brake drum. A further object is to provide an improved method of forming the composite brake drum, whereby the brake drum may be strong and durable in construction and may also be made economically.

These and other objects of the invention will become apparent from the following description, taken in connection with the accompany drawing, in which Figure 1 is an elevation of a brake drum construction showing an embodiment of my invention Figure 2 is a cross section on the line 2—2 of Figure 1;

Figures 3, 4, 5, 6, 7 and 8 are views similar to Figure 2, showing other embodiments of my invention.

1 is the brake drum which is designed particularly for use with motor vehicle wheels and is revoluble and 2 is the back plate which is stationary and adapted to carry the brake and its adjacent actuating means. The brake drum is a composite brake drum having a sheet metal and preferably a sheet steel shell or housing and a cast brake engaging liner therewithin. The shell or housing comprises the back or web 3 and the integral peripheral annular flange 4 and the liner is the centrifugally cast liner 5 which is preferably formed of cast iron and fused or molecularly bonded to the annular flange and the adjacent part of the back or web. The annular flange 4 preferably has at its free edge the integral annular reinforcing rib 6 and may have other integral annular reinforcing ribs, if desired. The back plate 2 is preferably formed of sheet metal and has the annular groove 7 with the annular peripheral flange 8 forming the outer wall of this groove. The annular groove is preferably formed by pressing or rolling the back plate and opens toward the brake drum.

To form an effective seal between the brake drum and the back plate for excluding foreign material from entering the brake drum and clearing the brake drum of foreign material, the annular flange of the brake drum extends over and encircles the annular peripheral flange of the back plate. More particularly, I have provided at the free edge of the brake drum the annular groove 9 which receives the annular flange 8 of the back plate and provides sufficient clearance to take care of off tread allowance of the wheels and to take care of relative movement of the brake drum and back plate during operation. This annular groove 9 is formed principally by cutting away or machining the edge of the liner 5 so that the reinforcing rib 6 extends axially over and encircles the annular flange 8 and the inner part of the liner extends axially within the annular groove 7 and is encircled by the annular flange 8. The required clearance between the inner part of the liner and the walls of the annular groove in the back plate is also provided for. The part of the liner encircled by the annular flange 8 has substantially the same thickness as the part of the liner within the main part of the annular flange 4. With this arrangement the brake drum extends over and encircles the back plate at its periphery and a circuitous passage, which is in general S-shaped, is provided between the brake drum and the back plate, thereby providing a labyrinth seal between these parts.

The brake drum shell or housing is formed first by a pressing or drawing operation and is provided with the inwardly extending and preferably rearwardly inclined annular flange 10 at its free edge which is shown by the dotted lines in Figure 2. The liner 5 is then centrifugally cast within the shell or housing and in a manner such that this liner is fused and molecularly bonded with the shell or housing, the flange 10 functioning to retain the molten metal. After the liner has cooled, the flange 10 and the adjacent end part of the liner as shown by dotted lines are cut away or machined to form the annular groove for receiving the peripheral flange 8 of the back plate. Also the inner face of the liner as shown by dotted lines is removed to form the brake engaging face.

In the modification shown in Figure 3, there is the same general arrangement of parts and the method of forming the brake drum is substantially the same. However, the annular flange 11 of the brake drum shell or housing has at its free edge a more abrupt reinforcing rib 12, the side wall of which forms the inner end of the annular groove 13 receiving the peripheral annular flange 14 of the back plate 15. Also in this construction the retaining flange 16 of the shell or housing extends substantially radially, the arrangement being such that less molten metal is used in forming the centrifugally cast liner 17.

Figure 4 discloses another modification in which the brake drum shell or housing and the centrifugally cast liner are formed with additional encircling beads or ribs and in which the annular groove 18 at the free edge of the brake drum for receiving the peripheral annular flange 19 of the back plate 20 is formed entirely within the liner. The back plate has substantially the same construction as that shown in Figure 3.

Figure 5 discloses another modification in which the annular groove 21 receiving the peripheral annular flange 22 of the back plate 23 is formed by the sheet metal and preferably sheet steel retainer 24, which latter is fixedly secured, as by welding, in the reinforcing rib 25 at the free edge of the brake drum shell or housing 26. The side walls of this retainer forming the annular groove are substantially co-extensive and are spaced apart to an extent such that the inner diameter of the inner side wall is at least equal to and preferably greater than the inner diameter of the annular flange of the brake drum shell or housing. The retainer has the radially inwardly extending annular flange 27 at the rear edge of the inner groove forming wall and the inner edge of this flange and the inner face of the centrifugally cast liner as shown by dotted lines are cut away or machined after the centrifugal casting operation.

As shown in Figure 6, the composite brake drum has the annular flange 28 which has at its free edge the radially inwardly extending annular portion 29 terminating in the annular axially extending or cylindrical flange 30. This shell or housing also has fixedly secured thereto, as by welding, the sheet metal and preferably sheet steel ring 31 which extends axially over the peripheral annular flange 32 of the back plate 33 and cooperates with the radially inwardly extending portion 29 and the axially extending flange 30 to form the annular groove receiving the peripheral annular flange 32. In this case the radially extending portion 29 serves to retain the molten metal which forms the centrifugally cast liner 34 of the brake drum.

In the modification shown in Figure 7, the reinforcing rib at the free edge of the annular flange 35 is the angle shaped sheet metal ring 36 which encircles the free edge of the annular flange and extends therebeyond and is fixedly secured to this annular flange as by means of welding its foot flange 37 to the annular flange. The free edge of the annular flange and the ring cooperate to form the annular groove for receiving the peripheral annular flange 38 of the back plate 39 and the free edge of the annular flange 35 and of the centrifugally cast lining 40 extend into the annular groove formed in the back plate.

Figure 8 discloses another modification in which the brake drum has an annular flange 41 in the nature of a ferrous ring and this ring may be a centrifugal casting or may be formed from steel mill section stock which is hooped and has its ends welded together. This ring is suitably secured as by a welding operation to the back or web of the brake drum. The ring has at its free edge the integral reinforcing annular rib 42 which terminates in an axially extending portion extending over and encircling the peripheral annular flange 43 of the back plate 44. This rib forms with the free edge portion 45 of the ring an annular groove for receiving the peripheral annular flange 43 and it is fashioned by turning the same over from the position indicated by dotted lines 46 either by a rolling operation or by a die operation. The ring may also be provided intermediate its edges with the integral annular reinforcing rib 47.

What I claim as my invention is:

1. In a brake drum construction, the combination with a back plate having an annular flange, of a brake drum comprising an annular flange, a liner within said last mentioned flange, and a retainer for said liner permanently secured to said last mentioned flange and forming an annular groove receiving said first mentioned flange.

2. In a brake drum construction, the combination with a back plate, of a revoluble brake drum comprising an annular flange, a liner within said flange, and a retainer for said liner permanently secured to said flange and providing a space within said flange receiving said back plate.

3. In a brake drum construction, the combination with a back plate having an annular groove with an annular flange forming the outer wall of the groove, of a brake drum comprising an annular flange having a portion encircling said first mentioned flange, a liner within said last named flange and a retainer for the liner secured to the last named flange and forming with the portion aforesaid of the last named flange a groove for receiving said first mentioned flange.

JOSEPH E. BATIE.